(12) United States Patent
Hill

(10) Patent No.: US 9,695,491 B2
(45) Date of Patent: Jul. 4, 2017

(54) BENEFICIATION PROCESS FOR LOW GRADE URANIUM ORES

(71) Applicant: Uranium Beneficiation Pty Ltd, West Perth (AU)

(72) Inventor: Murray Philip Hill, Booragoon (AU)

(73) Assignee: Uranium Beneficiation Pty Ltd, West Perth (AU)

( * ) Notice: Subject to any disclaimer, the term of this patent is extended or adjusted under 35 U.S.C. 154(b) by 37 days.

(21) Appl. No.: 14/435,780

(22) PCT Filed: Apr. 23, 2013

(86) PCT No.: PCT/AU2013/000421
§ 371 (c)(1),
(2) Date: Apr. 15, 2015

(87) PCT Pub. No.: WO2014/059461
PCT Pub. Date: Apr. 24, 2014

(65) Prior Publication Data
US 2015/0267279 A1 Sep. 24, 2015

(30) Foreign Application Priority Data
Oct. 17, 2012 (AU) .............................. 2012904542

(51) Int. Cl.
*C22B 60/00* (2006.01)
*C22B 60/02* (2006.01)
(Continued)

(52) U.S. Cl.
CPC ............ *C22B 60/0208* (2013.01); *B03B 7/00* (2013.01); *C22B 1/00* (2013.01); *C22B 3/06* (2013.01);
(Continued)

(58) Field of Classification Search
CPC ............ C22B 60/0204; C22B 60/0208; C22B 60/0247; C22B 1/00; C22B 3/06; C22B 3/12; B03B 7/00
(Continued)

(56) References Cited

U.S. PATENT DOCUMENTS 2,175,484 A * 10/1939 Dunn ........................ B03B 9/00
209/2
2,442,429 A * 6/1948 Nye ........................ C22B 60/00
423/11
(Continued)

FOREIGN PATENT DOCUMENTS

WO   2011/161650 A1   12/2011

OTHER PUBLICATIONS

International Preliminary Report on Patentability dated Apr. 21, 2015, for the corresponding International application No. PCT/AU2013/000421.
(Continued)

*Primary Examiner* — Steven Bos
(74) *Attorney, Agent, or Firm* — Morgan, Lewis & Bockius LLP

(57) ABSTRACT

The disclosure relates to a beneficiation process for low grade uranium ore, wherein the process comprises a primary beneficiation stage comprising: wet scrubbing the low grade uranium ore to separate the low grade ore into a fine fraction and a coarse fraction; screening the fine fraction according to a size separation parameter to provide an undersize fraction and an oversize fraction, wherein the uranium predominantly reports to the undersize fraction; and separating the undersize fraction to produce an intermediate uranium concentrate. The intermediate uranium concentrate may be further processed in a secondary beneficiation stage to produce a high grade uranium concentrate.

23 Claims, 1 Drawing Sheet

(51) Int. Cl.
*C22B 1/00* (2006.01)
*B03B 7/00* (2006.01)
*C22B 3/06* (2006.01)
*C22B 3/12* (2006.01)

(52) U.S. Cl.
CPC ............ *C22B 3/12* (2013.01); *C22B 60/0204* (2013.01); *C22B 60/0226* (2013.01); *C22B 60/0247* (2013.01)

(58) Field of Classification Search
USPC .......................................... 423/3, 20; 209/17
See application file for complete search history.

(56) References Cited

U.S. PATENT DOCUMENTS

| | | | | |
|---|---|---|---|---|
| 2,464,313 | A | * | 3/1949 | Weinig ..................... B03D 1/06 209/155 |
| 2,562,024 | A | | 7/1951 | Dunn et al. |
| 2,630,369 | A | * | 3/1953 | Burwell ................. C01G 31/00 423/17 |
| 2,647,629 | A | | 8/1953 | Veltman |
| 2,654,653 | A | | 10/1953 | Nye et al. |
| 2,697,518 | A | | 12/1954 | Bennett et al. |
| 2,736,634 | A | * | 2/1956 | Gaudin ............... C22B 60/0208 423/18 |
| 3,964,997 | A | | 6/1976 | Weston |
| 4,070,276 | A | | 1/1978 | Broman et al. |
| 5,573,738 | A | | 11/1996 | Ma et al. |
| 6,098,810 | A | | 8/2000 | Burwell |

OTHER PUBLICATIONS

International Search Report dated May 30, 2013, for International application No. PCT/AU2013/000421.
Takada et al., "Uranium processing pilot mill at the Ningyo-toge mine," The Recovery of Uranium: Proceedings of a Symposium, Aug. 17, 1970.
Lunt et al., "Uranium ectraction: the key process drivers," The Journal of the Southern African Institute of Mining and Metallurgy, 107:419-426 (2007).
Deep Yellow Limited—ASX Announcement—Quarterly Activities Report, for the period ending Mar. 31, 2010.
Langer Heinrich Mine, Namibia, Southern Africa (Feb. 2011).
Marenica Energy Limited, Activities Report for the Quarter Ended Mar. 31, 2011.
Coffey Mining Pty Ltd., Technical Report Laguna Salada—Initial Resource Estimate, May 20, 2011.
Marenica Energy Limited, Marenica Reports Positive Outcomes from Technical Review of Marenica Uranium Deposit, Namibia, ASX / Media Release, Mar. 7, 2012.

* cited by examiner

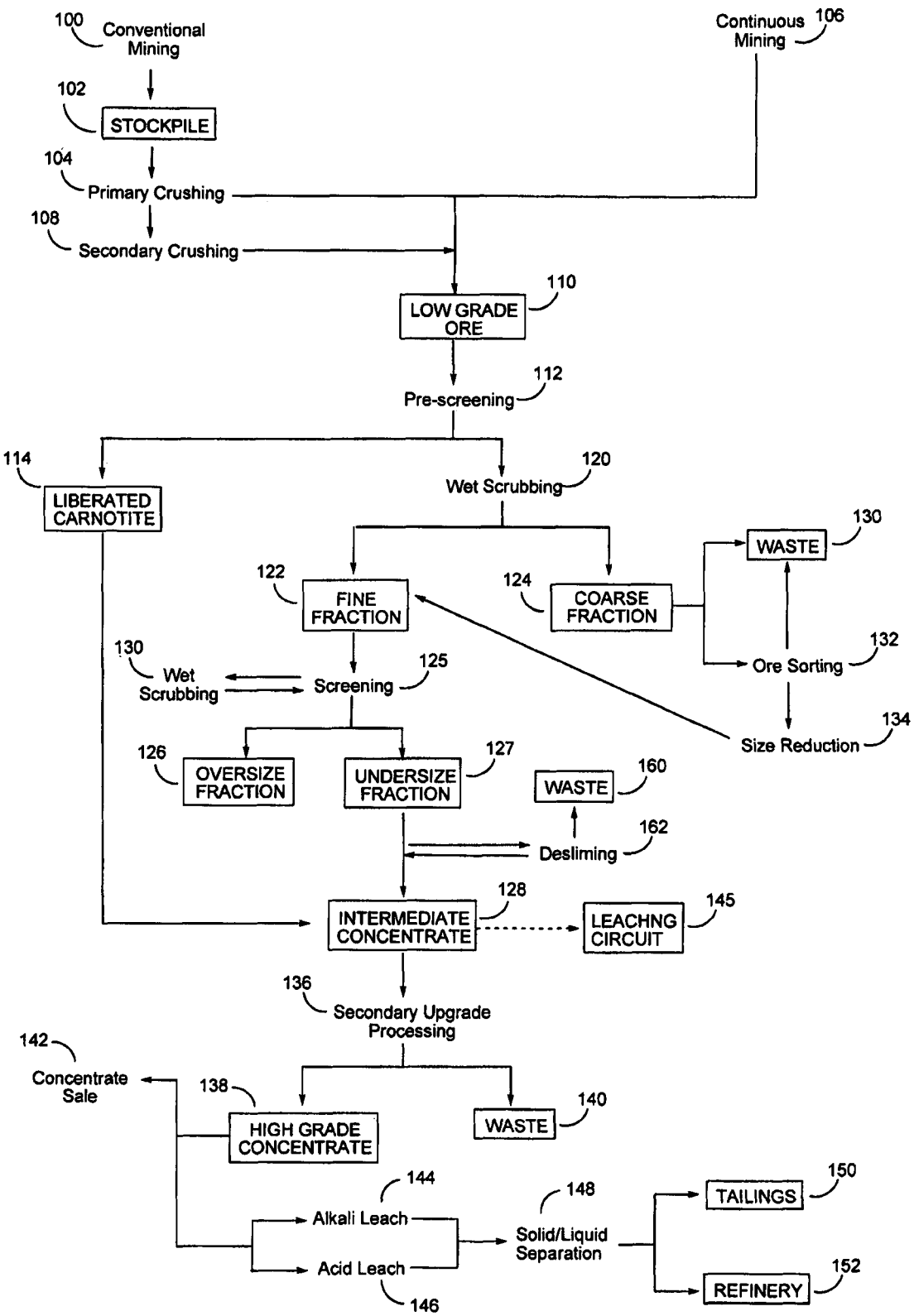

US 9,695,491 B2

BENEFICIATION PROCESS FOR LOW GRADE URANIUM ORES

TECHNICAL FIELD

The present invention relates to processes for enhanced physical beneficiation of low grade uranium ores.

BACKGROUND

Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed before the priority date of each claim of this specification.

Physical beneficiation of low grade ores to yield a higher grade product as feedstock for further downstream processing is a key component of many metallurgical operations. The format of the overall physical beneficiation process, which may consist of more than one individual but integrated unit steps, is typically designed to maximise a number of positive technical and economic outcomes when the processing flowsheet is considered in detail as a whole.

Regardless of the mineralogical complexity and number of target minerals of an ore, the format of the physical beneficiation process is primarily concerned with achieving the optimum balance between the grade of the beneficiation product(s) and the overall recovery of the target mineral(s) into the beneficiation product(s). This balance is especially relevant for lower grade and more complex ores, and more especially ores that contain one or more target minerals.

The capital and operating costs associated with the downstream processing of a high grade concentrate are considerably more advantageous than those applicable to treating a higher volume of a lower grade concentrate to achieve the same overall recovery (mass) of target mineral(s) on completion of the downstream circuit. The capital and operating costs must also take into account that the recovery of target mineral(s) into a higher grade concentrate is typically lower than that attained with a lower grade concentrate. That is, a certain higher percentage of the target mineral(s) typically may not be recovered into the higher grade concentrate because of, for example, restricted mineral phase liberation at the selected-processing particle size.

Almost without exception, uranium ores and concentrates are leached under either alkaline or acidic conditions, the choice of leachant being a direct consequence of the uranium mineralogy itself, and more particularly the mineralogy of the matrix of gangue minerals. For some run-of-mine uranium ores the grade and mineralogy are such that pre-leach treatment is limited to crushing and agglomeration for heap leaching, or crushing and wet grinding for conventional tank leaching. Radiometric sorting may be applied if appropriate.

For lower grade uranium ore, the feedstock to the downstream leaching circuit will often be produced by a combination of physical techniques such as heavy media separation (gravity) and flotation. For example, U.S. Pat. No. 2,847,629, U.S. Pat. No. 2,697,518, U.S. Pat. No. 3,964,997, U.S. Pat. No. 4,070,276 and WO 2011/161650 describe procedures for recovering uranium concentrates by froth flotation procedures of varying complexity. The feedstocks for the processes described in these documents range from run-of-mine ores, to tailings, to sulphide (pyrite) concentrates. The complexity of the froth flotation procedures is a reflection of the mineralogical complexity of the feedstock and the level of concentration (upgrading or mass pull) required due to the large volume and low concentration of uranium in the feedstock. Thus, for example, WO 2011/161650 describes a method in which the flotation collector is added incrementally in 3-6 separate steps. This adds considerably to the physical size and complexity of the froth flotation circuit. As a consequence, the processing of lower grade ores by methods known in the art is sub-economic.

There is therefore a need for commercially viable processes for upgrading the concentration of uranium in ores derived from low grade uranium ore.

SUMMARY OF THE INVENTION

In a first aspect the present invention provides a beneficiation process for low grade uranium ore, wherein the process comprises a primary beneficiation stage comprising:
wet scrubbing the low grade uranium ore to separate the low grade ore into a fine fraction and a coarse fraction;
screening the fine fraction according to a size separation parameter to provide an undersize fraction and an oversize fraction, wherein the uranium predominantly reports to the undersize fraction; and separating the undersize fraction to produce an intermediate concentrate.

The beneficiation process is intended to upgrade the uranium into a reduced-mass concentrate suitable for conventional leaching.

The primary beneficiation stage increases the concentration of uranium and reduces the mass/volume of material ultimately fed to a downstream leaching circuit. The process of the invention therefore allows a relatively low grade uranium ore, such as a calcrete hosted uranium ore, that would be sub-economic to process using conventional techniques, to be upgraded and leached in a commercially viable process.

During the wet-scrubbing step the low grade uranium ore for example, run-of-mine ore) may be separated into two or more size distribution groups (fractions) to produce at least one fraction having a greater concentration (% weight, or % volume, or ppm) of uranium relative to other fractions. The wet scrubbing step may separate the low grade ore into fractions having varying degrees of coarseness. The wet scrubbing step will typically separate a low grade uranium ore into two size distribution groups, for example, a coarse fraction characterised by larger particles, and a fine fraction characterised by smaller particles. Typically, the wet scrubbing step will comprise scrubbing of low intensity to separate the coarse and fine fractions. Suitable equipment for performing the low intensity scrubbing is known to those skilled in the art, and includes industrial screens, scrubbers, trommels, and the like.

In presently preferred embodiments, the fine fraction comprises particles having a maximum diameter or width less than about 4-6 mm and the coarse fraction comprises particles having a minimum diameter or width greater than about 4-6 mm. Those skilled in the art will appreciate that the particles may be irregular in size. Accordingly, the minimum and maximum diameter or width take into account the smallest and largest measurements, respectively, for a given particle. Those skilled in the art will also appreciate that there is a degree of overlap between the size selection for the coarse fraction and the fine fraction.

As the mass of material after the wet scrubbing step has already been substantially reduced relative to the initial mass of the low grade ore, the volume of water required in the subsequent screening stage may be substantially reduced.

In presently preferred embodiments the low grade uranium ore is a calcrete hosted uranium ore comprising carnotite $[K_2(UO_2)_2(VO_4)_2.3H_2O]$. The $U_3O_8$ content of the ore will typically be about 80-150 ppm. Preferably, the uranium-bearing mineral (eg, carnotite) occurs as discrete, well-liberated grains. In most preferred embodiments the carnotite occurs as discrete, well-liberated grains having a particle size typically less than about 125 µm.

Preferably, during the screening step the bulk of the uranium minerals will report to a fine fraction having a grain size below an upper size limit, wherein the size limit is determined according to a maximum diameter or width of a particle. The size parameter may be selected such that the uranium predominantly reports to the fine fraction(s). Thus, the size distribution parameters may be selected such that the intermediate concentrate may contain at least about 75% of the total uranium present in the low grade uranium ore. In various preferred embodiments, the intermediate concentrate may contain at least about 80%, or at least about 85%, or at least about 90%, or at least about 95% of the total uranium present in the low grade uranium ore.

In presently preferred embodiments, the size separation parameter is approximately 125 microns. Thus, the undersize fraction contains uranium particles having a maximum diameter or width of less than 125 microns and the oversize fraction contains uranium particles having a minimum diameter or width of greater than 125 microns.

In preferred embodiments of the invention the process may further comprise a pre-screening step before the wet scrubbing step. The pre-screening step, which in preferred embodiments is a low intensity wet screening step, may be used to separate liberated carnotite particles from the low grade uranium ore before the wet scrubbing step. Accordingly, the screening step screens for particles having a maximum size or diameter of approximately 125 microns so as to separate liberated carnotite particles from the low grade ore. Inclusion of a pre-screening step minimises scrubbing of already liberated carnotite and thus helps minimise generation of carnotite fines during the wet scrubbing.

The liberated carnotitie particles separated during the pre-screening step may be combined with the undersize fraction to form the intermediate concentrate.

The primary beneficiation step substantially reduces the mass of material relative to the mass of the initial low grade ore. Thus, the present invention offers an advantage of substantially reducing the mass/volume of material to be processed downstream. In typically preferred embodiments the mass of the intermediate concentrate will typically be from about 10% to about 40%, more typically from about 15% to about 30%, of the mass of the low grade uranium ore. Accordingly, in various alternative embodiments the mass of the intermediate concentrate is about 10%, about 15%, about 20%, about 25%, about 30%, about 35% or about 40% of the mass of the low grade uranium ore. In another typically preferred embodiment, the mass of the intermediate concentrate is from about 15% to about 35% of the mass of the low grade uranium ore.

The concentration of uranium in the intermediate concentrate will typically be increased relative to the concentration of uranium in the initial low grade ore. For example, the concentration of uranium in the intermediate concentrate may be at least about 2-10 times or at least about 3-7 times the concentration of uranium in the low grade uranium ore. Accordingly, in various preferred embodiments, the concentration of uranium in the intermediate concentrate may be at least about 2-times, or at least about 3-times, or at least about 4-times, or at least about 5-times, or at least about 6-times, or at least about 7-times, or at least about 8-times, or at least about 9-times, or at least about 10-times more concentrated than the concentration of uranium in the low grade uranium ore.

Thus the primary beneficiation stage will typically produce an intermediate concentrate having a substantially reduced total mass/volume relative to the initial low grade ore, while also retaining the bulk (preferably at least 75%) of the uranium present in the low grade ore. In this way, the concentration of uranium in the intermediate concentrate may be substantially increased relative to the low grade ore. As a consequence, the intermediate concentrate may advantageously reduce the mass/volume of feedstock and improve the efficiency of downstream processing.

Preferably, the coarse fraction(s) will be substantially free of uranium, but can be subjected to radiometric testing to determine whether any uranium-mineral particles (eg, coarse carnotite particles) are present before discarding. If uranium-containing particles are detected, the coarse fraction may be further processed (eg, subjected to an additional crushing step) and then another screening step may be carried out to separate a further fine fraction containing uranium. The fine uranium-containing fractions may be combined as the intermediate concentrate.

In accordance with the present invention, further physical beneficiation of the intermediate concentrate to provide a high grade concentrate provides a means of substantially reducing the overall capital and operating costs for a fully integrated mining/physical beneficiation/leaching processing facility.

Accordingly, the process according to the invention may comprise a secondary beneficiation stage after the primary beneficiation stage to produce a high grade concentrate. The use of primary and secondary beneficiation stages according to this embodiment of the invention may offer a further economic advantage in that the high grade concentrate may be sold for toll processing by a third party.

The secondary beneficiation stage will typically comprise one or more concentration steps to produce a high grade concentrate having an increased concentration of uranium relative to the concentration of uranium in the intermediate concentrate. Preferably the high grade concentrate has reduced mass and reduced volume relative to the intermediate concentrate.

Typically, the secondary beneficiation stage comprises a single concentration step, or it may comprise a combination of any two or more concentration steps in sequence in any suitable order. Examples of suitable concentration steps include, non-exhaustively, de-sliming, gravity separation, flotation, reflux classification and magnetic separation. Gravity separation may involve the use of a spiral separator, a falcon separator, a multigravity separator, or any other suitable gravity separation means known to those skilled in the art. Multi-gravity separators are particularly useful for sub 100 micron fine materials and enable recovery and selective concentration of ultra-fine minerals at multiple 'g' forces.

Physical beneficiation steps such as flotation, reflux classification and magnetic separation are known to those skilled in the art. For example, flotation systems are described for example in U.S. Pat. No. 2,647,629, U.S. Pat. No. 2,697,518, U.S. Pat. No. 3,964,997, U.S. Pat. No. 4,070,276, and WO 2011/161650.

The intermediate concentrate may therefore be processed in the secondary beneficiation stage to produce a high grade concentrate having an increased concentration of uranium and reduced mass relative to the intermediate concentrate. The high grade concentrate will preferably contain at least about 70% of the uranium present in the low grade uranium ore. In one embodiment the mass of the high grade concentrate may be from about 0.1% to 10% of the low grade ore. Typically the concentration of uranium in the high grade concentrate is at least about 15-times, or typically at least about 20-times the concentration of uranium in the low grade uranium ore.

The intermediate concentrate may be further processed in a leaching circuit, primarily to extract uranium minerals. Alternatively, or in addition, the high grade concentrate produced from the secondary beneficiation stage may be further processed in a leaching circuit.

Advantageously, due to the reduced mass, reduced volume and increased uranium concentration in the intermediate and high grade concentrates relative to the initial low grade uranium ore, downstream processing may be simplified and may be more cost-effective.

Those skilled in the art will recognise that the invention may be practised in relation to any suitable low grade mineral resource. Preferably, the low grade ore is an ore in which the mineral(s) of value are well-liberated and amenable to recovery and concentration by appropriate physical beneficiation step(s). In preferred embodiments of the invention, the physical beneficiation process may be designed so as to produce a single multi-mineral intermediate concentrate or high grade concentrate. In other preferred embodiments of the invention, the process may produce two or more intermediate concentrates or high grade concentrates enhanced with particular mineral(s) of value. In particularly preferred embodiments of the invention, the physical beneficiation process may be designed so as to produce a single intermediate concentrate and/or high grade concentrate having a substantially increased concentration of one mineral of value relative to the low-grade ore from which it is derived.

Preferably, the physical beneficiation process of the present invention does not result in a significant increase in the overall loss of uranium recovery to waste. Preferably, the size and metallurgical complexity of the final downstream uranium recovery circuit (eg, leaching circuit) may be substantially reduced because of the reduced volume and increased concentration of the uranium in the intermediate concentrate and high grade uranium concentrate feedstock.

An additional potential advantage of the present invention is that it provides the option to process high grade uranium concentrate at a site distant from the uranium mining operation itself, or for the uranium concentrate to be transported or sold to another party for toll uranium processing.

In a particularly preferred embodiment the uranium content in the intermediate concentrate or the high grade uranium concentrate may be upgraded by a factor in the range from about 5 to at least about 50 relative to the uranium content in the low grade ore. In one or more preferred embodiments, the uranium content may be upgraded by a factor in the range of from about 10 to about 40, for example, a factor of about 10, or about 15, or about 20, or about 25, or about 30, or about 35, or about 40 or about 45 relative to the uranium content in the low grade ore.

Thus, for example, in one or more preferred embodiments of the present invention the uranium content in a low grade uranium ore may be improved from an initial content of about 80-150 ppm $U_3O_8$ to a content in excess of 2000 ppm $U_3O_8$, eg, in excess of 2500 ppm, or in excess of 3000 ppm, or in excess of 4000 ppm, or up to 5000 ppm, in a high grade concentrate.

Preferably the upgrading process does not result in excessive loss of uranium minerals to the waste mass.

In accordance with the present invention the overall mass of feedstock fed to the leach circuit may be significantly reduced, for example by a factor of at least 20, preferably by a factor of at least about 30, more preferably by a factor of about 40, even more preferably by a factor of about 50, or a factor of about 100, or a factor of about 200, thereby significantly improving the capital and operating costs of the leach circuit itself.

The process of the present invention accordingly involves in a typically preferred embodiment a multi-stage series of beneficiation steps based upon a primary beneficiation stage to reduce the mass of feedstock that is either fed directly to an extraction (leaching) circuit, or forwarded to a secondary beneficiation stage to produce a high grade concentrate. The high grade concentrate may be sold for toll processing, or fed to a downstream extraction (leaching) circuit.

Direct physical beneficiation (eg, de-sliming, flotation, gravity separation, etc) of low grade run-of-mine ore (which may be considered the conventional approach followed in the art) without the primary beneficiation stage to produce the intermediate uranium concentrate, results in the generation of a much lower grade final concentrate, and a much lower overall uranium recovery. Thus, the conventional approach of direct physical beneficiation of low grade ore, is economically and commercially unsound, particularly in view of the size and complexity of the downstream processing circuits required to process vast amounts of low grade ore.

Performing a primary beneficiation stage to generate an intermediate concentrate, which may optionally undergo further physical beneficiation in a secondary beneficiation stage, may significantly improve the recovery and efficiency of the overall process, and reduce the mass of material fed to the leach circuit. An advantageous consequence of this is that the process can achieve a significant reduction in the volume of leachant required to extract a valuable mineral, and a significant reduction in the size and complexity of the leach circuit. Thus, the present invention provides a commercially viable means of extracting valuable minerals, such as uranium, from low grade ores.

BRIEF DESCRIPTION OF THE DRAWING

In order that the beneficiation process of the present invention may be more clearly understood, preferred embodiments will be described with reference to the processing of a low grade uranium ore as depicted in FIG. 1, which is a flowsheet exemplifying a presently preferred embodiment of the invention.

While the following embodiment is particularly concerned with the physical beneficiation of a calcrete hosted uranium ore containing well-liberated carnotite [$K_2(UO_2)_2$ $(VO_4)_2.3H_2O$], those skilled in the art will recognise that the general principles are equally applicable to a wide range of other low-grade mineral resources in which the mineral of value is well liberated and amenable to recovery in an intermediate concentrate and optionally further concentration to a high grade concentrate.

A low grade uranium ore 110 may be obtained by conventional mining methods 100 or continuous mining methods 106. Conventional mining 100 typically includes generating a stockpile 102 then crushing the stockpile in a primary crushing step 104 to produce the low grade uranium ore 110. In some cases, a secondary crushing step 108 may be performed after the primary crushing step 104. In particularly preferred embodiments the present invention is directed to the beneficiation and concentration of a low-grade uranium ore that typically has a $U_3O_8$ content of about 80-150 ppm in which the uranium-bearing mineral (carnotite) occurs as discrete, well-liberated grains with a particle size typically less than 125 µm. The processing of such a low-grade uranium ore by conventional agitated tank or conventional heap leaching would be sub-economic because of the high leach reagent consumption as a consequence of the high mass of calcrete gangue mineralisation.

A pre-screening step 112 may be performed on the low grade uranium ore 110 to separate out already liberated carnotite particles 114. Typically, the pre-screening 112 step may involve wet-screening to separate particles having a maximum diameter or width of about 125 microns, which is the typical size of discrete well liberated grains of carnotite.

The remainder of the low grade ore 110 is then subjected to a low intensity wet scrubbing step 120 to separate the low grade ore 110 into a fine fraction 122 characterised by smaller particles and a coarse fraction 124 characterised by larger particles. The intensity of the wet scrubbing step 120 may be selected and varied to suit specific conditions and criteria. Suitable equipment for performing the low intensity scrubbing include industrial screens, scrubbers, trommels.

The fine fraction 122 is typically comprised of particles having a maximum diameter or width of about 4-6 mm and the coarse fraction 124 is typically comprised of particles having a minimum diameter or width of about 4-6 mm. The fine fraction 122 contains a greater concentration (% weight, or % volume, or ppm) of uranium relative to the coarse fraction 124. Typically the coarse fraction (>4-6 mm) is substantially uranium free and may be discarded as waste 130. Alternatively, a radiometric sorting step 132 may be performed on the coarse fraction 124. If radioactivity is detected the coarse fraction 124 may be subjected to a further size reduction step 134 to separate a further fraction having a maximum diameter or width of about 4-6 mm, which may be combined with the fine fraction 122.

The fine fraction 122 is subjected to an additional screening step 125 and wet scrubbing 130 at a suitable size whereby the bulk (eg, >80%) of the uranium (carnotite) mineralisation reports to the undersize fraction 127. For a typical low-grade uranium ore 110, approximately 80% of the carnotite reports to the <125 µm fraction and constitutes about 10%-40%, typically about 15%-30%, more typically about 20% of the mass of the original mass of low-grade ore 110. The oversized fraction 126 may be discarded.

The undersize fraction 127 may be refined in a desliming step 162 and waste 160 material separated to produce an intermediate concentrate 128. The liberated carnotite particles 114 may be incorporated into the intermediate concentrate to increase the overall uranium concentration in the intermediate concentrate 128. By this means an intermediate concentrate 128 that typically contains 400-750 ppm $U_3O_8$ may be obtained.

In view of the substantially increased concentration of uranium and reduced mass of the intermediate concentrate 128 relative the low grade ore, in some embodiments the intermediate concentrate 128 may be fed directly to a downstream leaching circuit 145. Alternatively, the intermediate concentrate 128 may be subjected to a secondary beneficiation upgrade processing step 136 to produce a high grade uranium concentrate 138 having an increased concentration of uranium. Waste 140 may be discarded.

The incorporation of a secondary beneficiation stage in the physical beneficiation process may provide additional advantages. Thus, treating the intermediate concentrate 128 with one or more additional beneficiation steps, such as de-sliming, magnetic separation, gravity separation (eg, spiral, falcon, MGS), reflux classification, or flotation, may yield a final high grade concentrate 138 containing in excess of 2500 ppm $U_3O_8$, with an overall uranium recovery of at least about 70% relative to the low grade ore 110. Additionally, the overall mass of high grade concentrate 138 fed to the leach circuit 144,145 may be reduced to about 20% or less relative to the mass of the initial low grade ore 110.

A particular benefit of this embodiment of the invention is that the high grade concentrate 138 may be offered for sale 142 and the uranium extracted at another site. Alternatively, the high grade concentrate may be subjected to an acid or alkaline leaching circuit 144, 146 in a standard extraction leach plant. Due to the substantially reduced mass and increased concentration of uranium in the high grade concentrate 138, the size and complexity of the leach plant may be significantly reduced relative to conventional leaching of the low grade ore 110, or in processes that do not form the intermediate concentrate 128. In addition, the volume of water, acid and base required may be substantially reduced, all of which improve the potential commercial viability of the inventive process.

The uranium residue of the leaching circuit 144, 146 may be separated by solid/liquid separation 148 to separate the valuable uranium product which may then be processed in a refinery 152. The waste tailings 150 may be discarded.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Throughout this specification, unless the context requires otherwise, the word "comprise", or variations such as "comprises" or "comprising", will be understood to imply the inclusion of a stated element, integer or step, or group of elements, integers or steps, but not the exclusion of any other element, integer or step, or group of elements, integers or steps.

The invention claimed is:

1. A beneficiation process for low grade uranium ore, wherein the process comprises:
   a primary beneficiation stage comprising:
       wet scrubbing the low grade uranium ore to separate the low grade ore into a fine fraction and a coarse fraction;
       screening the fine fraction according to a size separation parameter to provide an undersize fraction and an oversize fraction, wherein the uranium predominantly reports to the undersize fraction; and
       separating the undersize fraction to produce an intermediate uranium concentrate.

2. The process according to claim 1, wherein the low grade uranium ore is a calcrete hosted uranium ore.

3. The process according to claim 2, wherein the low grade uranium ore comprises carnotite $[K_2(UO_2)_2(VO_4)_2 \cdot 3H_2O]$.

4. The process according to claim 1, wherein the coarse fraction comprises particles having a minimum diameter or width greater than about 4-6 mm and the fine fraction comprises particles having a maximum diameter or width less than about 4-6 mm.

5. The process according to claim 1, wherein the size separation parameter is approximately 125 microns.

6. The process according to claim 5, wherein the undersize fraction contains uranium particles having a maximum diameter or width of less than 125 microns and the oversize fraction contains uranium particles having a minimum diameter or width of greater than 125 microns.

7. The process according to claim 1 further comprising a pre-screening step before the wet scrubbing step to separate liberated carnotite particles from the low grade uranium ore.

8. The process according to claim 7, wherein the pre-screening step comprises wet-screening.

9. The process according to claim 7, wherein the liberated carnotite particles have a maximum diameter or width of approximately 125 microns.

10. The process according to claim 9, wherein the liberated carnotite particles are combined with the undersize fraction to produce the intermediate uranium concentrate.

11. The process according to claim 1, wherein the intermediate concentrate contains at least about 75% of the uranium present in the low grade uranium ore.

12. The process according to claim 1, wherein the concentration of uranium in the intermediate concentrate is from about 3-times to about 10-times the concentration of uranium in the low grade uranium ore.

13. The process according to claim 1, wherein the mass of the intermediate concentrate is from about 10% to about 40% of the mass of the low grade uranium ore.

14. The process according to claim 13, wherein the mass of the intermediate concentrate is from about 15% to about 30% of the mass of the low grade uranium ore.

15. The process according to claim 1, further comprising processing the intermediate concentrate in a secondary beneficiation stage to produce a high grade concentrate having an increased concentration of uranium and reduced mass relative to the intermediate concentrate.

16. The process according to claim 15, wherein the secondary beneficiation stage comprises one or more concentration steps.

17. The process according to claim 16, wherein the or each concentration step is selected from the group consisting of de-sliming, gravity separation, flotation, reflux classification and magnetic separation.

18. The process according to claim 15, wherein the high grade concentrate contains at least about 70% of the uranium present in the low grade uranium ore.

19. The process according to claim 15, wherein the mass of the high grade concentrate is from about 0.1% to 10% of the mass of the low grade ore.

20. The process according to claim 15, wherein the concentration of uranium in the high grade concentrate is at least about 15-times the concentration of uranium in the low grade uranium ore.

21. The process according to claim 1, wherein the intermediate concentrate is further processed in a leaching circuit.

22. The process according to claim 15, wherein the high grade concentrate is further processed in a leaching circuit.

23. The process according to claim 21, wherein the leaching circuit comprises alkali leach treatment, acidic leach treatment, or a combination thereof in any order.

\* \* \* \* \*